(12) United States Patent
Uoe (10) Patent No.: US 8,926,891 B2
(45) Date of Patent: Jan. 6, 2015

(54) METHOD FOR MANUFACTURING CERAMIC HONEYCOMB FIRED BODY

(75) Inventor: Kousuke Uoe, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/640,662

(22) PCT Filed: Apr. 27, 2011

(86) PCT No.: PCT/JP2011/060294
§ 371 (c)(1),
(2), (4) Date: Oct. 11, 2012

(87) PCT Pub. No.: WO2011/145445
PCT Pub. Date: Nov. 24, 2011

(65) Prior Publication Data
US 2013/0049269 A1 Feb. 28, 2013

(30) Foreign Application Priority Data
May 17, 2010 (JP) ................................ 2010-113290

(51) Int. Cl.
*C04B 35/64* (2006.01)
*C04B 35/478* (2006.01)
*B01J 35/04* (2006.01)

(52) U.S. Cl.
CPC ............... *C04B 35/64* (2013.01); *C04B 35/478* (2013.01); *B01J 35/04* (2013.01); *C04B 2235/9623* (2013.01)
USPC ........... 264/630; 264/631; 264/632; 264/634; 264/652

(58) Field of Classification Search
USPC .......................... 264/630–632, 634, 652, 672
See application file for complete search history.

(56) References Cited

U.S. PATENT DOCUMENTS 4,786,542 A 11/1988 Yasuda et al.
5,256,347 A * 10/1993 Miyahara ..................... 264/40.6
(Continued)

FOREIGN PATENT DOCUMENTS

| JP | 62-202870 A | 9/1987 |
| JP | 1-54636 B2 | 11/1989 |

(Continued)

OTHER PUBLICATIONS

International Search Report of PCT/JP2011/060294 dated Jul. 19, 2011.

(Continued)

*Primary Examiner* — Joseph S Del Sole
*Assistant Examiner* — Nahida Sultana
(74) *Attorney, Agent, or Firm* — Sughrue Mion, PLLC (57) ABSTRACT

Manufacture of ceramic honeycomb fired body. Green molded body is placed on a firing base and fired. The firing base and green molded body are each a column containing a ceramic raw material and having a partition wall forming a plurality of flow paths, and patterns of end surfaces of the two partition walls are the same as each other as seen from an extending direction of the flow paths. The green molded body is placed on the firing base displaced in a horizontal direction by a predetermined distance, or rotated around a vertical axis V of the green molded body by a predetermined angle θ, so that only a part of the lower side end surface of the partition wall of the green molded body is in contact with the upper side end surface of the partition wall of the firing base.

8 Claims, 4 Drawing Sheets

(56) References Cited

U.S. PATENT DOCUMENTS

| | | | |
|---|---|---|---|
| 5,316,710 A * | 5/1994 | Tasaki et al. | 264/630 |
| 7,540,898 B2 | 6/2009 | Oshimi | |
| 7,543,513 B2 | 6/2009 | Kobayashi et al. | |
| 7,687,008 B2 * | 3/2010 | Okazaki et al. | 264/442 |
| 8,038,928 B2 * | 10/2011 | Otterbach | 264/628 |
| 2006/0185335 A1 | 8/2006 | Ichikawa | |
| 2006/0261136 A1 * | 11/2006 | Sano | 228/193 |
| 2007/0001349 A1 * | 1/2007 | Muroi et al. | 264/605 |
| 2007/0199205 A1 * | 8/2007 | Hoshino et al. | 34/437 |
| 2007/0199643 A1 * | 8/2007 | Kawai et al. | 156/89.22 |
| 2008/0136053 A1 * | 6/2008 | Kuribayashi et al. | 264/177.12 |
| 2008/0142149 A1 | 6/2008 | Noguchi et al. | |
| 2009/0113879 A1 * | 5/2009 | Ohno | 60/297 |
| 2009/0257945 A1 * | 10/2009 | Biris et al. | 423/447.3 |
| 2012/0248090 A1 | 10/2012 | Furukawa et al. | |
| 2013/0224431 A1 * | 8/2013 | Bronfenbrenner et al. | 428/116 |
| 2014/0007452 A1 * | 1/2014 | Saito | 34/265 |
| 2014/0220294 A1 | 8/2014 | Ono et al. | |

FOREIGN PATENT DOCUMENTS

| | | |
|---|---|---|
| JP | 2006-231162 A | 9/2006 |
| JP | 2007-091536 A | 4/2007 |
| JP | 2009-084102 A | 4/2009 |
| WO | 2006/035674 A1 | 6/2006 |

OTHER PUBLICATIONS

Extended European Search Report issued Aug. 21, 2013 in counterpart European Patent Application No. 13150585.1.

International Preliminary Report on Patentability and Written Opinion mailed Dec. 20, 2012 in International Application No. PCT/JP2011/060294 to Sumitomo Chemical Co., Ltd.

European Search Report dated Nov. 8, 2013 issued in European Patent Application No. 11783382.2.

Office Action issued Sep. 15, 2014 in U.S. Appl. No. 13/752,461 to Kousuke Uoe.

* cited by examiner

METHOD FOR MANUFACTURING CERAMIC HONEYCOMB FIRED BODY

CROSS REFERENCE TO RELATED APPLICATIONS

This application is a National Stage of International Application No. PCT/JP2011/060294 filed Apr. 27, 2011, claiming priority based on Japanese Patent Application No. 2010-113290 filed May 17, 2010, the contents of all of which are incorporated herein by reference in their entirety.

TECHNICAL FIELD

The present invention relates to a method for manufacturing a ceramic honeycomb fired body.

BACKGROUND ART

Conventionally, a method for manufacturing a ceramic honeycomb fired body by firing a green (unfired) molded body of a honeycomb structure having a large number of flow paths has been known. It has been known that firing is performed after the green molded body is placed on an unfired firing base (referred to as a firing stilt) of a honeycomb structure similar to that of the green molded body (for example, see Reference 1).

When such a firing base is used, the firing base shrinks or expands in a similar manner that the green molded body shrinks or expands according to its structure and the like, during firing. Therefore, a ceramic honeycomb fired body having high dimensional precision can be manufactured.

CITATION LIST

Patent Literature

Patent Literature 1: Japanese Examined Patent Publication No. 1-54636

SUMMARY OF INVENTION

Technical Problem

However, in the conventional method, after firing, the ceramic honeycomb fired body and the fired firing base adhere firmly to each other, and there have been cases where it is difficult to pull them away from each other. Therefore, there have been cases where the ceramic honeycomb fired body is broken in peeling.

The present invention has been made in view of the above problems, and it is an object of the present invention to provide a method for manufacturing a ceramic honeycomb fired body in which it is easy to peel the ceramic honeycomb fired body and a fired firing base from each other after firing.

Solution to Problem

A method for manufacturing a ceramic honeycomb fired body according to the present invention includes a step of placing a green molded body on a firing base; and a step of firing the firing base and the green molded body. The firing base and the green molded body are each a column containing a ceramic raw material and having a partition wall forming a plurality of flow paths, and patterns of end surfaces of these two partition walls are the same as each other as seen from an extending direction of the flow paths. In the placing step, using, as a reference position, a state of the whole of one end surface of the partition wall of the green molded body being in contact with an upper side end surface of the partition wall of the firing base, the green molded body is placed on the firing base in a state of being displaced in a horizontal direction by a predetermined distance, or in a state of being rotated around a vertical axis of the green molded body by a predetermined angle, so that only a part of one end surface of the partition wall of the green molded body is in contact with the upper side end surface of the partition wall of the firing base placed horizontally.

According to the present invention, the green molded body is placed on the firing base so that only a part of an end surface of the partition wall of the green molded body is in contact with the upper side end surface of the partition wall of the firing base, and then, these are fired, and therefore, contact area between the green molded body and the firing base can be reduced. Therefore, it is easy to pull the firing base away from the honeycomb fired body after firing.

It is preferable that the firing base and the green molded body are each a cylinder or a regular polygonal prism, and the vertical axis is a central axis of the cylinder or the regular polygonal prism. Thus, the control of the amount of rotation, and rotation operation are easy.

In addition, it is preferable that the plurality of flow paths in each of the firing base and the green molded body are arranged in squares, as seen from the end surface side, and in the placing step, with respect to the reference position, the green molded body is placed on the firing base in a state of being rotated around the vertical axis of the green molded body by 15° to 75°+n·90°. Here, n is an integer, for example, n=0, 1, 2, or 3.

In addition, it is also preferable that the plurality of flow paths in each of the firing base and the green molded body are arranged in regular triangles or regular hexagons, as seen from the end surface side, and in the placing step, with respect to the reference position, the green molded body is placed on the firing base in a state of being rotated around the vertical axis of the green molded body by 10° to 50°+n·60°. Here, n is an integer, for example, n=0, 1, 2, 3, 4, or 5.

The contact area can be more efficiently decreased by such a method.

In addition, it is preferable that one (upper end) openings of a part of the plurality of flow paths of the green molded body are plugged, and the other (lower end) openings of a remaining part of the plurality of flow paths of the green molded body are plugged.

According to this embodiment, a plugging material introduced into plugging portions often projects slightly from the end surfaces of the green molded body, and its projecting length is often nonuniform, and therefore, there is an effect that the green molded body and the firing base are less likely to adhere to each other.

In addition, the firing base and the green molded body may each be an elliptic cylinder, and it is preferable that the elliptic cylindrical green molded body is placed on the firing base in the state of being displaced in a horizontal direction by a predetermined distance.

In addition, it is preferable that the ceramic raw materials of the firing base and the green molded body each contain an aluminum source powder and a titanium source powder.

Advantageous Effects of Invention

According to the present invention, a method for manufacturing a ceramic honeycomb fired body in which it is easy to peel the ceramic honeycomb fired body and a fired firing base from each other after firing can be provided.

DESCRIPTION OF EMBODIMENTS

A method for manufacturing a ceramic honeycomb fired body according to an embodiment of the present invention will be described with reference to the drawings.

In this embodiment, the method includes the step of placing a green molded body 1 on a firing base 5, and the step of firing the firing base 5 and the green molded body 1.

(Placement Step)

Figure 1:
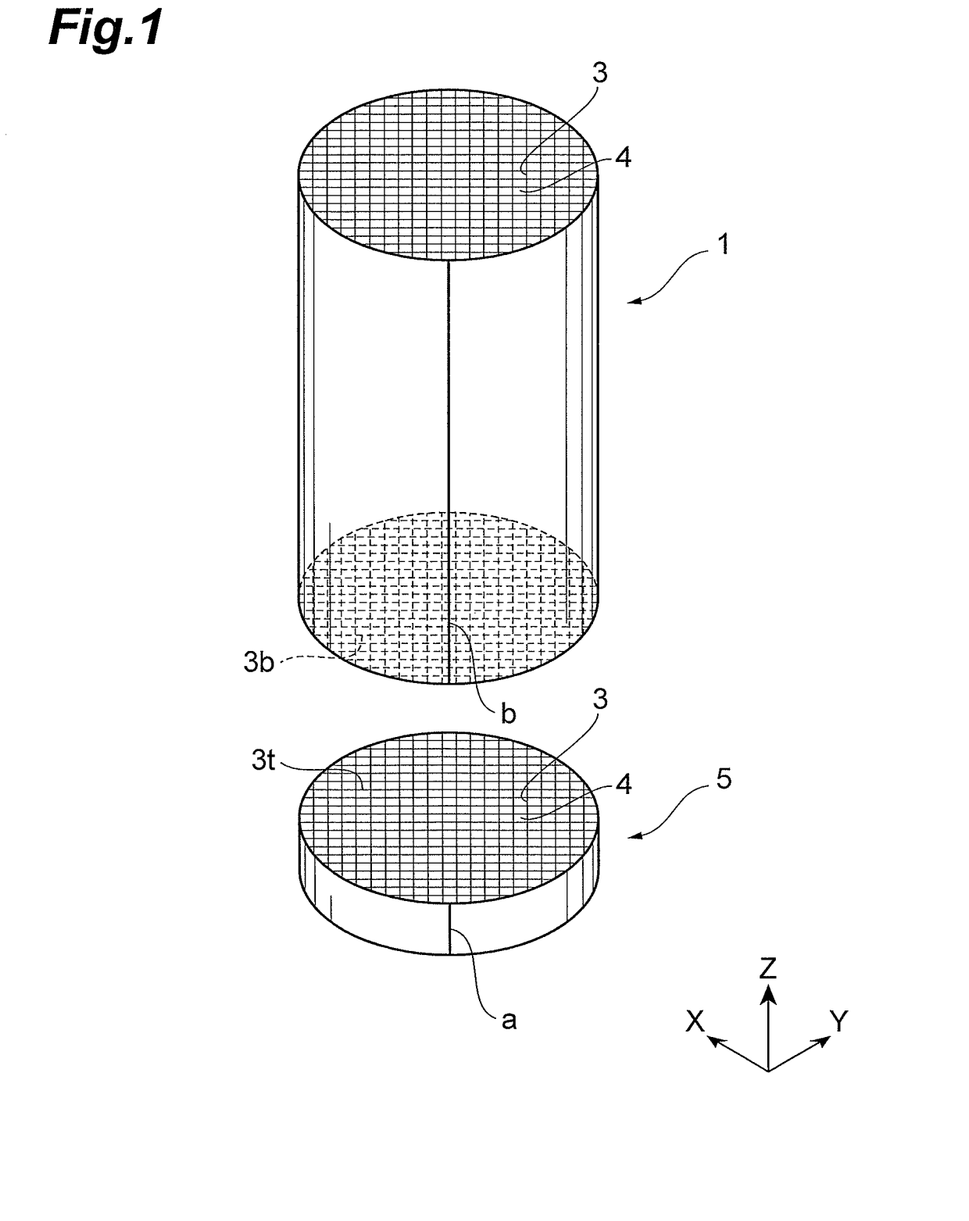
FIG. 1 is a schematic perspective view of a firing base 5 and a green molded body 1.

The green molded body 1 and the firing base 5 according to this embodiment are each a cylinder having partition walls 3 forming a large number of flow paths 4 extending in a vertical direction, as shown in FIG. 1. Patterns that end surfaces of the partition walls 3 form in the green molded body 1 and the firing base 5 are the same as each other. The cross-sectional shape of the flow path 4 is generally square. These plurality of flow paths 4 are arranged in squares in the firing base 5 and the green molded body 1 as seen from an end surface side (Z direction), that is, the plurality of flow paths 4 are arranged so that the centers of the flow paths 4 are positioned at the respective vertexes of squares. The size of the square of the cross section of the flow path 4 can be, for example, one side of 0.8 to 2.5 mm. The thickness of the partition wall can be, for example, 0.15 to 0.76 mm.

In addition, the lengths of the green molded body 1 and the firing base 5 in a direction in which the flow paths 4 extend (total lengths in the Z direction) are not particularly limited, and can be, for example, 40 to 350 mm and 5 to 50 mm, respectively. In addition, the outer diameter of the green molded body 1 is also not particularly limited, and can be, for example, 100 to 320 mm.

The green molded body 1 and the firing base 5 are each a green (unfired body) that becomes a porous ceramic by firing and each contain a ceramic raw material. The ceramic is not particularly limited, and examples of the ceramic include oxides, such as alumina, silica, mullite, cordierite, glass, and aluminum titanate, silicon carbide, silicon nitride, and metals. Aluminum titanate can further contain magnesium and/or silicon.

The green molded body and the firing base 5 each preferably contain an inorganic compound source powder that is a ceramic raw material, and an organic binder, such as methyl cellulose, and additives added as required.

For example, when the ceramic is aluminum titanate, the inorganic compound source powder contains an aluminum source powder, such as an α-alumina powder, and a titanium source powder, such as an anatase type or rutile type titania powder, and/or an aluminum titanate powder and can further contain a magnesium source powder, such as a magnesia powder or a magnesia spinel powder, and/or a silicon source powder, such as a silicon oxide powder or a glass fit, as required.

Examples of the organic binder include celluloses, such as methyl cellulose, carboxylmethyl cellulose, hydroxyalkylmethyl cellulose, and sodium carboxylmethyl cellulose; alcohols, such as polyvinyl alcohol; and lignin sulfonate. The amount of the organic binder is preferably 20 parts by weight or less, more preferably 15 parts by weight or less, and further preferably 6 parts by weight, with respect to 100 parts by weight of the inorganic compound source powder. In addition, the lower limit amount of the organic binder is preferably 0.1 parts by weight, more preferably 3 parts by weight.

Examples of the additives include a pore-forming agent, a lubricant and a plasticizer, a dispersing agent, and a solvent.

Examples of the pore-forming agent include carbon materials, such as graphite; resins, such as polyethylene, polypropylene, and polymethyl methacrylate; plant materials, such as starch, nutshells, walnut shells, and corn; ice; and dry ice. The amount of the pore-forming agent added is preferably 0 to 40 parts by weight, more preferably 0 to 25 parts by weight, with respect to 100 parts by weight of the inorganic compound source powder.

Examples of the lubricant and the plasticizer include alcohols, such as glycerin; higher fatty acids, such as caprylic acid, lauric acid, palmitic acid, arachidic acid, oleic acid, and stearic acid; metal stearates, such as Al stearate; and polyoxyalkylene alkyl ether. The amount of the lubricant and the plasticizer added is preferably 0 to 10 parts by weight, more preferably 0.1 to 5 parts by weight, with respect to 100 parts by weight of the inorganic compound source powder.

Examples of the dispersing agent include inorganic acids, such as nitric acid, hydrochloric acid, and sulfuric acid; organic acids, such as oxalic acid, citric acid, acetic acid, malic acid, and lactic acid; alcohols, such as methanol, ethanol, and propanol; and surfactants, such as ammonium polycarboxylate. The amount of the dispersing agent added is preferably 0 to 20 parts by weight, more preferably 2 to 8 parts by weight, with respect to 100 parts by weight of the inorganic compound source powder.

As the solvent, for example, alcohols, such as methanol, ethanol, butanol, and propanol; glycols, such as propylene glycol, polypropylene glycol, and ethylene glycol; and water can be used. The amount of the solvent used is preferably 10 parts by weight to 100 parts by weight, more preferably 20 parts by weight to 80 parts by weight, with respect to 100 parts by weight of the inorganic compound source powder. In addition, the weight of the solvent with respect to the weight of the entire green honeycomb molded body is not particularly limited, but is preferably 10 to 30 wt %, more preferably 15 to 20 wt %.

It is possible that one (upper end) openings of a part of the plurality of flow paths 4 of the green molded body 1 are plugged with a plugging material, and the other (lower end) openings of the remaining part of the plurality of flow paths of the green molded body 1 are plugged with the plugging material. As the plugging material, a material that becomes a ceramic by firing, similar to the green molded body 1, can be used. The above-described "part of the plurality of flow paths 4" is preferably a combination of the flow paths alternately selected in a matrix of flow path cross sections sharing sides and being continuous, in the pattern of end surfaces of the partition walls of the above flow paths, as seen from an end surface side.

The green molded body can be manufactured, for example, as follows.

First, an inorganic compound source powder, an organic binder, a solvent, and additives added as required are prepared. Then, these are mixed by a kneading machine or the like to obtain a raw material mixture, and the obtained raw material mixture is extruded from an extruder having outlet openings corresponding to the cross-sectional shapes of the partition walls, dried, and cut to the desired length, and thus, the green molded body 1 and the firing base 5 can be obtained. By manufacturing from the same extruder, the green molded body 1 and the firing base 5 can have the partition walls 3 of the same cross-sectional structure and can have the same composition. Then, the ends of the flow paths 4 can be plugged as required.

Here, marks a and b extending in an axial direction (Z direction) are provided in the same portions of the outer peripheral surfaces of the firing base 5 and the green molded body 1, respectively, with an ink, a groove, or the like. The cross-sectional shapes of the partition walls 3 are the same as each other, and therefore, when the marks a and b are on the same line, the end surfaces of the partition walls 3 can completely overlap each other.

Figure 2:
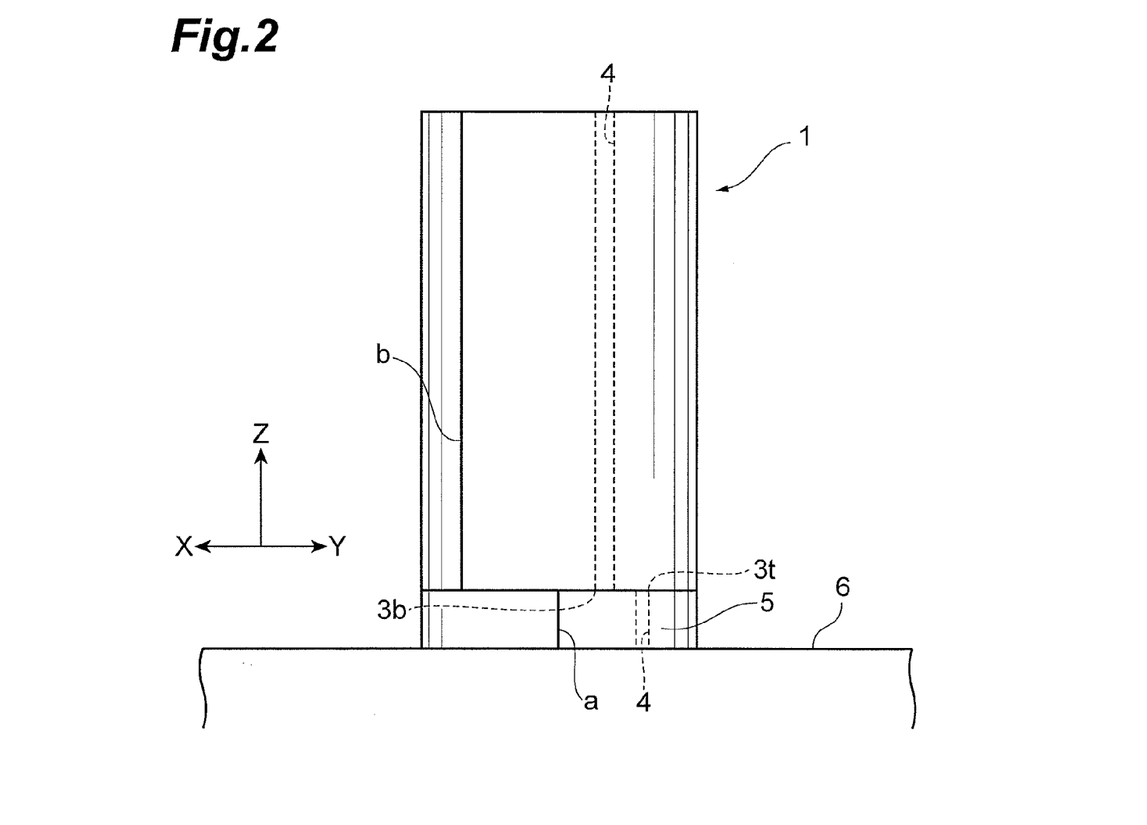
FIG. 2 is a side view showing a state in which the green molded body 1 is placed on the firing base 5.
Figure 3:
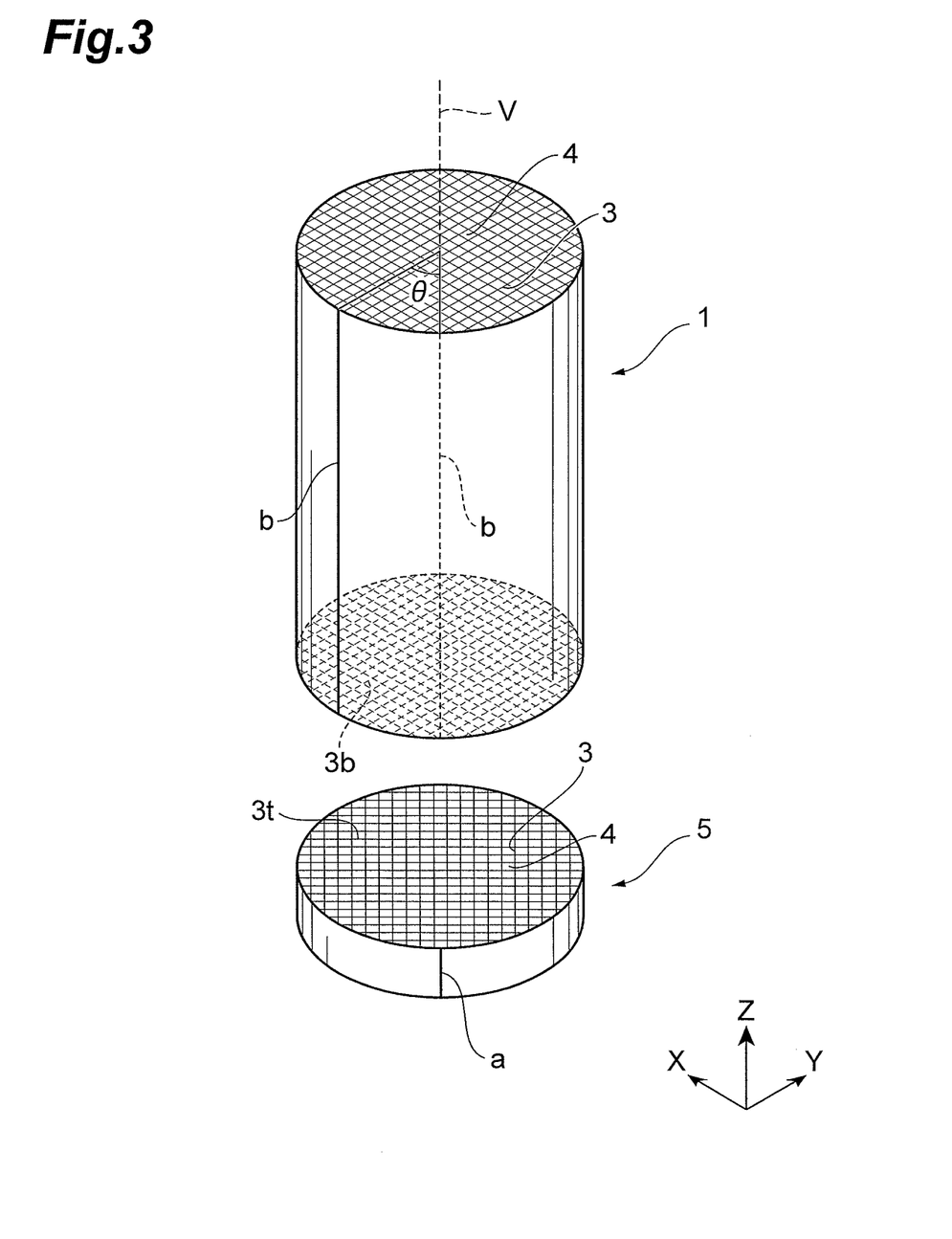
FIG. 3 is a schematic perspective view showing a way of rotating the green molded body 1 with respect to the firing base 5.

Next, as shown in FIG. 2, the firing base 5 is arranged on a support surface 6 in a furnace so that the axial direction of the flow paths 4 is the vertical direction, and the green molded body 1 is placed on the firing base 5 so that the axial direction of the flow paths 4 is the vertical direction. Here, only a part of the lower side end surfaces 3b of the partition walls 3 of the green molded body 1 are brought into contact with the upper side end surfaces 3t of the partition walls 3 of the firing base 5. Specifically, using, as a reference position, a state in which whole of the lower side end surfaces 3b of the partition walls 3 of the green molded body 1 are in contact with the upper side end surfaces 3t of the partition walls 3 of the firing base 5, as in FIG. 1, that is, a state in which the mark a and the mark b are on the same line, the green molded body 1 is placed on the firing base 5 as in FIG. 2 in a state in which the green molded body 1 is rotated around the central axis (vertical axis) V of the green molded body 1 by a predetermined angle θ as shown in FIG. 3.

Figure 4:
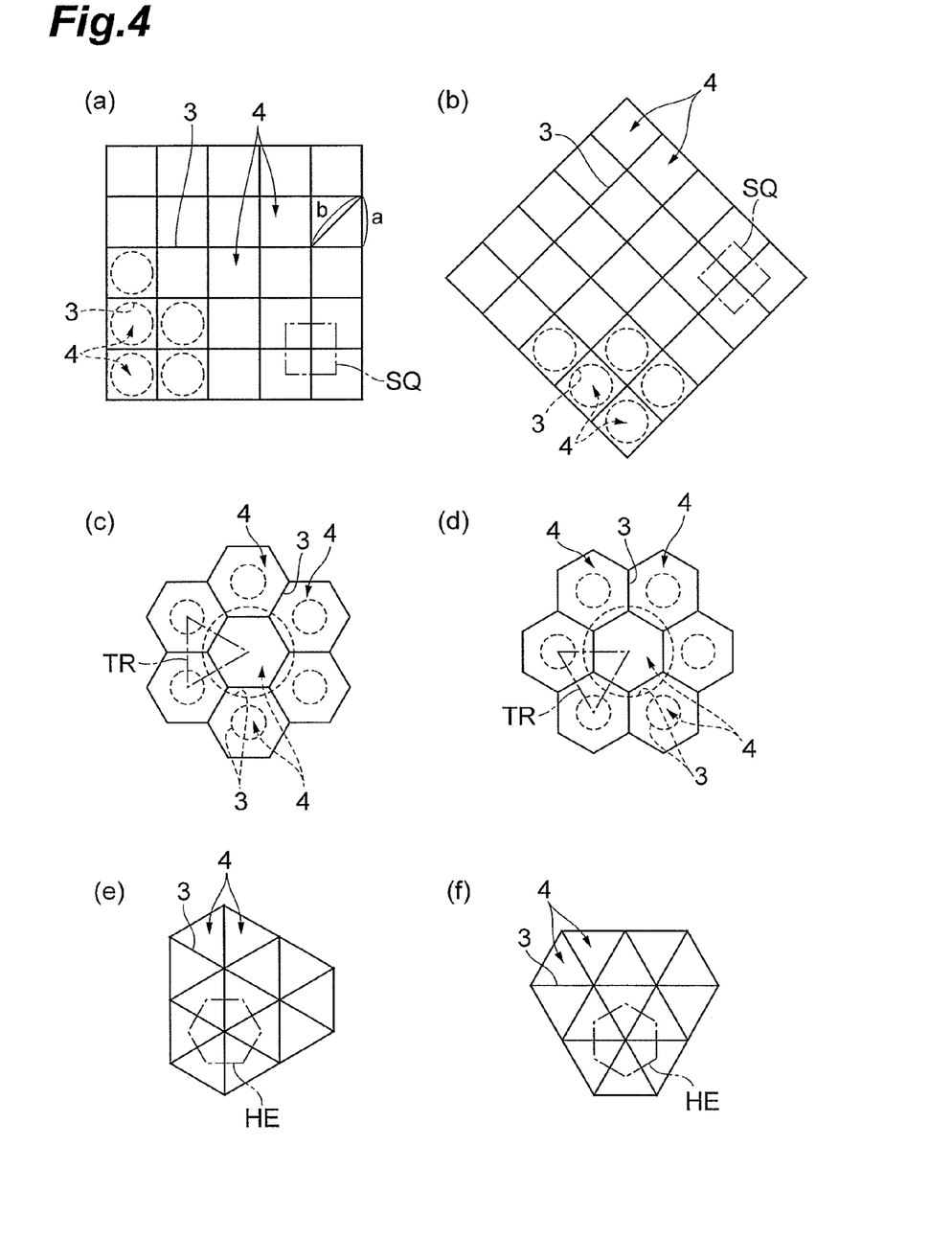
FIGS. 4(a) to 4(f) are schematic views as seen from an end surface side, each showing a structure of some of the flow paths 4 and partition walls 3 of the green molded body 1.

Here, the angle θ is not particularly limited as long as it is an angle at which only a part of the lower side end surfaces of the partition walls 3 of the green molded body 1 are in contact with the upper side end surfaces of the partition walls of the firing base 5. For example, when the green molded body 1 has the partition walls 3 in which the plurality of flow paths 4 whose cross section is a square are arranged in squares, that is, arranged so that the centers of the flow paths 4 whose cross section is a square are positioned at the respective vertexes of other squares SQ, as seen from an end surface, as shown in FIG. 4(a), it is only necessary that the rotation angle θ is not an integer multiple of 90°. The rotation angle θ is preferably 15 to 75°, more preferably 30 to 60°, further preferably 40 to 50°, and most preferably 45° as shown in FIG. 4(b). This case is preferable because the partition walls 3 of the green molded body 1 and the firing base 5 are less likely to be parallel to each other. In addition, the rotation angle θ may be an angle in which an integer multiple of 90° is added to these preferable θ ranges (for example, 15° to 75°+n·90°: n is an integer). In addition, the direction of θ may be either clockwise or counterclockwise. Even if the cross-sectional shape of the flow path 4 is another shape, for example, a circle as shown by a dotted line in FIG. 4(a), or there are those having different diameters, the above-described ranges are preferable when the flow paths 4 are arranged in squares.

(Firing Step)

Next, the green molded body 1 and the firing base 5 are fired. By calcining (degreasing) and firing the green molded body 1, a porous ceramic honeycomb fired body having flow paths can be obtained.

The calcination (degreasing) is a step for removing the organic binder, and organic additives blended as required, in the green molded body 1 and the firing base 5 by burning off, decomposition, or the like, and is typically performed in temperature increase stages to firing temperature (for example, a temperature range of 150 to 900° C.). In the calcination (degreasing) step, it is preferable that a temperature increase rate is minimized.

Firing temperature in the firing of the green molded body 1 and the firing base 5 is generally 1300° C. or more, preferably 1400° C. or more. In addition, the firing temperature is generally 1650° C. or less, preferably 1550° C. or less. The temperature increase rate to the firing temperature is not particularly limited and is generally 1° C./hour to 500° C./hour.

The firing is generally performed in the air, but firing may be performed in an inert gas, such as nitrogen gas or argon gas, or firing may be performed in a reducing gas, such as carbon monoxide gas or hydrogen gas, depending on the type of the raw material powder used and the ratio of the amounts thereof used. In addition, firing may be performed in an atmosphere in which water vapor partial pressure is lowered.

The firing is generally performed using a general firing furnace, such as a tubular electric furnace, a box type electric furnace, a tunnel furnace, a far infrared furnace, a microwave heating furnace, a shaft furnace, a reverberatory furnace, or a roller hearth furnace. The firing may be performed batchwise or may be performed continuously.

Time required for firing need only be time sufficient for a ceramic to be produced, and is different depending on the amount of the green molded body, the form of the firing furnace, firing temperature, firing atmosphere, and the like, and is generally 10 minutes to 24 hours.

After the firing, the fired firing base 5 is removed from the ceramic honeycomb fired body. A removal method is not particularly limited, and, for example, the fired firing base can be easily removed by lightly tapping it by a plastic hammer.

According to this embodiment, the green molded body 1 is subjected to shrinkage, expansion, or the like during firing, but the firing base 5 is also subjected to similar shrinkage or expansion, and therefore, unnecessary stress is not applied to the lower surface of the green molded body 1, and a ceramic honeycomb fired body having high dimensional precision can be manufactured.

Further, contact area between the green molded body 1 and the firing base 5 can be reduced, and therefore, it is easy to pull the firing base away from the ceramic honeycomb fired body after firing.

In addition, defects in which damage is given to the ceramic honeycomb fired body in peeling and in which a part of the firing base remains attached to the ceramic honeycomb-structured object can be inhibited.

The present invention is not limited to the above embodiment, and various modifications can be made. For example, the green molded body 1 and the firing base 5 are not particularly limited and can take any shapes according to use. For example, each of the green molded body 1 and the firing base 5 is not limited to a cylinder, and may be an elliptic cylinder and can further be, for example, a regular polygonal prism, such as a regular triangular prism, a square prism, a regular hexagonal prism, or a regular octagonal prism, or a column other than regular polygonal prisms, such as a triangular prism, a quadrangular prism, a hexagonal prism, or an octagonal prism. In this case, as a vertical axis, for example, eccentric rotation may be performed, but in terms of the ease of rotation, in the case of a regular polygonal prism or a cylinder, it is preferable to make these central axes vertical axes.

In addition, the cross-sectional shape of each flow path is also not limited to a square and can be a rectangle, a circle, an ellipse, or various polygons (including polygons that are not regular polygons), such as a triangle, a hexagon, and an octagon, or the like, and in these flow paths, those having different diameters from others, or those having different cross-sectional shapes from others may be mixed.

Further, the arrangement of the flow paths is also not limited to square arrangement in which the centers of gravity (centers when a flow path cross section is a circle or a regular polygon) of the flow paths are arranged at the vertexes of squares in a cross section, and can be regular triangular arrangement in which the centers of gravity (centers when a flow path cross section is a circle or a regular polygon) of the flow paths are arranged at the vertexes of regular triangles in a cross section, regular hexagonal arrangement in which the centers of gravity (centers when a flow path cross section is a circle or a regular polygon) of the flow paths are arranged at the vertexes of regular hexagons in a cross section, staggered arrangement, or the like.

For example, when the green molded body 1 has the partition walls 3 in which the plurality of flow paths 4 whose cross section is a regular hexagon are arranged in regular triangles, that is, arranged so that the centers of the flow paths 4 whose cross section is a regular hexagon are positioned at the respective vertexes of regular triangles TR, as seen from an end surface, as shown in FIG. 4(c), it is only necessary that the rotation angle θ is not an integer multiple of 60°. The rotation angle θ is preferably 10 to 50°, more preferably 20 to 40°, further preferably 25 to 35°, and most preferably 30° as shown in FIG. 4(d). In addition, the rotation angle θ may be an angle in which an integer multiple of 60° is added to these preferable θ ranges (for example, 10° to 50°+n·60°: n is an integer). In addition, the direction of θ may be either clockwise or counterclockwise. Even if the cross-sectional shape of the flow path 4 is another shape, for example, a circle as shown by a dotted line in FIGS. 4(c) and 4(d), or there are those having different diameters, the above-described ranges are preferable when the flow paths 4 are in regular triangular arrangement. In addition, even if the cross-sectional shape of some or all of the flow paths 4 is an irregular polygon, such as a hexagon that is not a regular hexagon, the above-described ranges are preferable when the centers of gravity of the flow paths are in regular triangular arrangement.

In addition, when the green molded body 1 has the partition walls 3 in which the flow paths 4 whose cross section is a regular triangle are arranged in regular hexagons, that is, arranged so that the centers of the flow paths 4 whose cross section is a regular triangle are positioned at the respective vertexes of regular hexagons HE, as seen from an end surface, as shown in FIG. 4(e), it is only necessary that the rotation angle θ is not an integer multiple of 60°. The rotation angle θ is preferably 10 to 50°, more preferably 20 to 40°, further preferably 25 to 35°, and most preferably 30° as shown in FIG. 4(f). In addition, the rotation angle θ may be an angle in which an integer multiple of 60° is added to these preferable θ ranges (for example, 10° to 50°+n·60°: n is an integer). In addition, the direction of θ may be either clockwise or counterclockwise. Even if the cross-sectional shape of the flow path 4 is another shape, for example, a circle, or there are those having different diameters, the above-described ranges are preferable.

In this manner, θ such that only a part of end surfaces of the partition walls of the green molded body are in contact with the upper side end surfaces of the partition walls of the firing base can be easily set according to the pattern of the end surfaces of the partition walls 3.

In addition, in the above embodiment, the marks a and b are provided on the green molded body 1 and the firing base 5 in order to displace the green molded body 1 at a preferable angle, but the form of a mark is not particularly limited, and practice is possible even without providing a mark and even by determining a position while visually seeing the partition walls 3.

Further, in the above embodiment, the green molded body 1 is rotated around the vertical axis V of the green molded body 1 by the angle θ, but practice is possible even by displacing the green molded body 1 by a predetermined distance in a horizontal direction, that is, in any direction in an XY plane in FIG. 2, so that only a part of end surfaces of the partition walls of the green molded body are in contact with end surfaces of the partition walls of the firing base. Of course, both rotation, and movement in a horizontal direction may be combined. When the green molded body 1 is an elliptic cylinder, it is preferable to carry out by displacing the green molded body 1 by a predetermined distance in a horizontal direction, that is, in any direction in a plane.

When the green molded body 1 is moved in a horizontal direction, it is preferable that the distance is, for example, a distance smaller than the repeating unit of a partition wall structure in a movement direction. For example, the repeating unit of a partition wall structure in a movement direction is the length a of one side of the partition wall 3 when the movement direction is a direction along one side of the square partition wall, and is the length b of the diagonal line of the partition wall 3 when the movement direction is a direction along the diagonal line of the square partition wall, in the case of FIG. 4(a).

Further, the green molded body 1 and the firing base 5 are molded from the same extruder, but even if they are molded from different extruders, it is only necessary that the cross-sectional shapes of the partition walls are the same. In addition, it is preferable that the compositions of the green molded body 1 and the firing base 5 are the same, but practice is possible even with different compositions when the green molded body and the firing base 5 show similar expansion-shrinkage behavior during firing.

REFERENCE SIGNS LIST

1 ... green molded body, 3 ... flow path, 4 ... partition wall, 5 ... firing base.

The invention claimed is:

1. A method for manufacturing a ceramic honeycomb fired body, comprising:
   a step of placing a green molded body on a flat surface of a firing base; and
   a step of firing the firing base and the green molded body, wherein
   the firing base and the green molded body are each a column comprising a ceramic raw material and having a partition wall forming a plurality of flow paths, and patterns of end surfaces of the two partition walls are the same as each other as seen from an extending direction of the flow paths, and
   in the placing step, using, as a reference position, a state of the whole of one end surface of the partition wall of the green molded body being in contact with an upper side end surface of the partition wall of the firing base, the green molded body is placed on the firing base in a position rotated around a vertical axis of the green molded body by a predetermined angle, so that only a part of the one end surface of the partition wall of the green molded body is in contact with the upper side end surface of the partition wall of the firing base placed horizontally, the flat surface of the firing base being in direct contact with the whole end surface of the green molded body and there being an offset between the flow paths of the firing base and the flow paths of the green molded body, wherein the plurality of flow paths in each of the firing base and the green molded body are arranged in squares, as seen from the end surface side, and in the placing step, with respect to the reference position, the green molded body is placed on the firing base in a position rotated around the vertical axis of the green molded body by 15° to 75°+n·90°, wherein n is an integer.

2. A method for manufacturing a ceramic honeycomb fired body, comprising:

a step of placing a green molded body on a flat surface of a firing base; and a step of firing the firing base and the green molded body, wherein the firing base and the green molded body are each a column comprising a ceramic raw material and having a partitioning wall forming a plurality of flow paths, and patterns of end surfaces of the two partition walls are the same as each other as seen from an extending direction of the flow path, and in the placing step, using, as a reference position, a state of the whole of one end surface of the partition wall of the green molded body being in contact with an upper side end surface of the partition wall of the firing base, the green molded body is placed on the firing base in a position rotated around a vertical axis of the green molded body by a predetermined angle, so that only a part of the one end surface of the partition wall of the green molded body is in contact with the upper end surface of the partition wall of the firing base placed horizontally, the flat surface of the firing base being in direct contact with the whole end surface of the green molded body and there being an offset between the flow paths of the firing base and the flow paths of the green molded body, wherein the plurality of flow paths in each of the firing base and the green molded body are arranged in regular triangles or regular hexagons, as seen from the end surface side, and in the placing step, with respect to the reference position, the green molded body is placed on the firing base in a position rotated around the vertical axis of the green molded body by 10° to 50°+n·60°, wherein n is an integer.

3. The method according to claim 1, wherein one of the openings of a part of the plurality of flow paths of the green molded body are sealed, and the other openings of a remaining part of the plurality of flow paths of the green molded body are sealed.

4. The method according to claim 1, wherein the ceramic raw materials of the firing base and the green molded body each comprise an aluminum source powder and a titanium source powder.

5. The method according to claim 2, wherein the firing base and the green molded body are each a cylinder or a regular polygonal prism, and the vertical axis is a central axis of the cylinder or the regular polygonal prism.

6. The method according to claim 2, wherein one of the openings of a part of the plurality of flow paths of the green molded body are sealed, and the other openings of a remaining part of the plurality of flow paths of the green molded body are sealed.

7. The method according to claim 2, wherein the ceramic raw materials of the firing base and the green molded body each comprise an aluminum source powder and a titanium source powder.

8. The method according to claim 1, wherein the firing base and the green molded body are each a cylinder or a regular polygonal prism, and the vertical axis is a central axis of the cylinder or the regular polygonal prism.

* * * * *